United States Patent [19]

Kimura et al.

[11] Patent Number: 5,345,280
[45] Date of Patent: Sep. 6, 1994

[54] DIGITAL CONVERGENCE CORRECTION SYSTEM AND METHOD FOR PREPARING CORRECTION DATA

[75] Inventors: Yuichiro Kimura; Yasuji Noguchi, both of Yokohama; Kuninori Matsumi, Fujisawa, all of Japan

[73] Assignee: Hitachi, Ltd., Tokyo, Japan

[21] Appl. No.: 16,701

[22] Filed: Feb. 11, 1993

[30] Foreign Application Priority Data

Feb. 26, 1992 [JP] Japan ................................ 4-039015

[51] Int. Cl.⁵ .............................................. H04N 9/28
[52] U.S. Cl. .................................. 348/745; 348/746; 348/806; 315/368.12; 315/368.13
[58] Field of Search ................... 358/60, 64, 56, 65, 358/10; 315/368.12, 368.13; 348/745, 746, 744, 805, 806, 807; H04N 9/28

[56] References Cited

U.S. PATENT DOCUMENTS

| | | | |
|---|---|---|---|
| 4,672,275 | 6/1987 | Ando | 358/60 |
| 4,673,847 | 6/1987 | Louie et al. | 358/65 |
| 4,816,908 | 3/1989 | Colineau et al. | 358/60 |
| 5,216,497 | 6/1943 | Tsujihara et al. | 358/60 |

FOREIGN PATENT DOCUMENTS

| | | | |
|---|---|---|---|
| 56-169985 | 12/1981 | Japan . | |
| 0013093 | 1/1991 | Japan | H04N 4/28 |
| 3-291089 | 12/1991 | Japan . | |

*Primary Examiner*—James J. Groody
*Assistant Examiner*—Michael H. Lee
*Attorney, Agent, or Firm*—Fay, Sharpe, Beall, Fagan, Minnich & McKee

[57] ABSTRACT

A digital convergence correction system and a method of preparing a convergence correction data used for an image display unit, including at least one cathode ray tube, are disclosed. Correction data at correction points at predetermined between adjusting points providing representative correction points are determined by interpolation. A whole section subjected to correction is segmented into a plurality of sub-sections. An interpolating function for each sub-section is an independent low-order function. The values of the interpolating functions for adjacent sub-sections sandwiching a boundary, i.e., an adjusting point, the values of the first order derivatives and the values of the second order derivatives, respectively, are rendered to be equal to each other at such adjusting point.

43 Claims, 10 Drawing Sheets

ADJUSTING POINT

DIGITAL CONVERGENCE CORRECTION SYSTEM AND METHOD FOR PREPARING CORRECTION DATA

BACKGROUND OF THE INVENTION

The present invention relates to a digital convergence correction system used for convergence correction of the screen of a display unit including the color television receiver or a display terminal using a cathode ray tube (CRT), or more in particular to a method for preparing convergence correction data for the convergence correction system.

Generally, a digital convergence correction system is used for correcting the convergence by determining the correction amount for each position requiring convergence correction on the screen, storing the correction data in digital form in memory as a correction data, reading the correction data in synchronism with the CRT screen scanning, and converting the correction data into an analog signal at a D/A converter.

The conventional digital convergence correction system described above is disclosed, for example, in JP-A-56-169985. According to this conventional convergence correction system, the job of determining all the correction data for all positions requiring convergence correction on the screen is too burdensome and not practical, and therefore the method as mentioned below is employed.

Specifically, several adjusting points representative of positions requiring convergence correction are designated on the screen. The correction data for these adjusting points are obtained by actual adjusting work. The correction data for a given position (correction position) between adjusting points is prepared by an interpolating operation using the correction data for two vertically adjacent adjusting points on the opposite sides of the particular position. This interpolating operation is performed by a linear method using the difference between the correction data at vertically two adjacent points.

FIG. 2 is a diagram for explaining an example of reference pattern for adjustment displayed on the screen in order to set an adjusting point on the screen. In FIG. 2, adjusting points are set at the positions of lattice points of a cross-hatched pattern (lattice pattern). Normally, in order to secure an adjusting point at the center of the screen, an odd number of adjusting points are provided in both vertical and horizontal directions.

FIG. 3 is a diagram for explaining the case in which the correction data at a given position between two adjacent adjusting points on a line of lattice points (adjusting points) in FIG. 2 is determined by linear interpolating operation using the difference of correction data between the two adjusting points. FIG. 4 is a diagram showing a hypothetical case where ideal correction data is obtained not by a linear approximation, but by some method or other, for the sake of comparison. In these diagrams, white circles represent adjusting points, and character x designates the position of an adjusting point (scanning line number) and character y the correction data of an adjusting point.

SUMMARY OF THE INVENTION

In the conventional method described above, the adjusting points are interpolated in simple linear function to obtain the correction data for a given position between adjusting points as shown in FIG. 3. Two straight lines, therefore, are not smoothly connected at an adjusting point corresponding to a boundary of the straight lines.

This is indicative of the fact that the line density of a scanning line is subjected to an abrupt change (known as "density modulation") at such an adjusting point, and this phenomenon is liable to present itself as something like a lateral line on the screen, thereby damaging the image quality. Especially in the case involving a fewer number of adjusting points, the inclinations of adjacent straight lines on the opposite sides of a given adjusting point vary to such an extent that the "lateral-line" phenomenon (i.e. generation of unwanted lateral lines on the screen) easily occurs on the one hand, and the difference (error) between the correction data obtained by linear interpolation and an ideal correction data such as shown in FIG. 4 is liable to increase on the other hand, thus making appropriate convergence correction difficult.

In another conceivable method not using the linear interpolation for connecting adjacent adjusting points by a straight line, a function which provides a curve fitting all adjusting points is determined as an interpolating function, and correction at a given point between adjusting points is obtained from this function. An example of such a method is disclosed in JP-A-3-291089. In this method, the interpolating function is given by a polynomial of the $(n-1)$th order, where n is the number of adjusting points.

Take a given vertical line in FIG. 2, for example, the number n of adjusting points is 5. The interpolating function, therefore, is a polynomial of fourth order with x as a variable. According to this method, generally, the more the adjusting points, the higher the order of the interpolating function. As a result, the functional waveform is smooth between adjacent sections on opposite sides with respect to an adjusting point as a boundary, but it oscillates between adjusting points, especially between those toward (or in the vicinity of) an end of a vertical line, thereby leading to the problem that the difference (error) between the correction data obtained by the interpolating function and an ideal correction data is often widened undesirably.

Although an interpolating function represents a curve smoothly connecting a plurality of adjusting points constituting a vertical line, for instance, what value is taken in the sections beyond the adjusting points at the ends of the line is unknown. In the case where the range of interpolation is extended to the sections beyond the adjusting points at the ends of the vertical line, therefore, the problem arises that the function value may increase or decrease suddenly, or the error increases thereby making it often impossible to obtain an appropriate correction data.

The object of the present invention is to solve the above mentioned problem and provide a digital convergence correction system and a method for preparing a correction data, in which the phenomenon of "lateral line" attributable to the change in scanning line density is prevented at each adjusting point on the screen while at the same time reducing the error of correction data, thus realizing an almost ideal convergence correction.

In order to achieve the above-mentioned object, according to one aspect of the present invention, there is provided a digital convergence correction system, in which the correction data for each of a plurality of convergence adjusting points selected at certain intervals on the screen is determined and stored in memory in advance, and the correction data for a given position between adjusting points is prepared by a combination of one-dimensional interpolating operations through an interpolating operation device, so that the correction data thus obtained are used for convergence correction. A section covered by the one-dimensional interpolating operation is divided into a plurality of sub-sections with the convergence adjusting points as boundaries included therein, the interpolating function used for the interpolating operation by the interpolating operation device is set as an independent function for each subsection, and the interpolating functions are set in such a manner that the values thereof, the values of the first order derivatives of the interpolating functions and, in some cases, the values of the second order derivatives of the interpolating functions, are equal to each other, respectively, for adjacent subsections on the opposite sides of each boundary, with the result that the waveforms of adjacent interpolating functions on the opposite sides of a boundary are continuous and smoothly connected at the boundary.

The first order derivative of the interpolating function represents the intervals of the scanning lines on the screen, and the second order derivative the inclination of change in the scanning line intervals. To the extent that these factors are uninterrupted at an adjusting point, the scanning line density is prevented from suddenly changing at an adjusting point, with the result that the lateral-line phenomenon at each adjusting point will also be prevented.

Further, if the first or second order derivative is to be meaningful or existent, the interpolating function between adjusting points is required to be a second or third order at least. Therefore, by defining a relatively low-order polynominal as the interpolation function, the waveform of the curve between adjusting points is not oscillatory. As a result, the difference (error) between the correction data determined by the interpolating function and an ideal correction data does not widen considerably.

DESCRIPTION OF THE PREFERRED EMBODIMENTS

Figure 5:
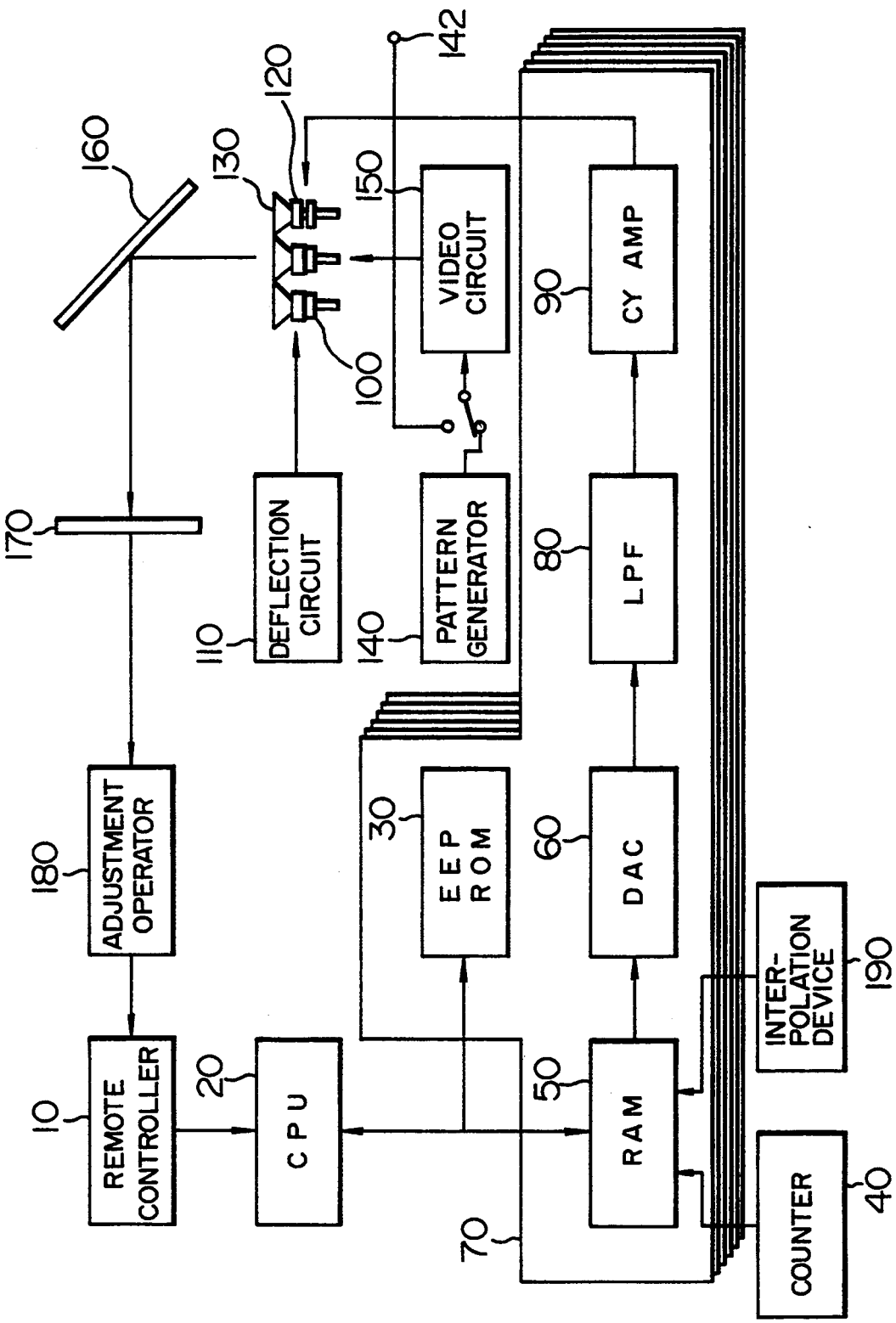
FIG. 5 is a block diagram showing a system configuration of a digital convergence correction system according to a first embodiment of the present invention.

An embodiment of the present invention will be explained. FIG. 5 is a block diagram showing a system configuration of a digital convergence correction system according to an embodiment of the present invention. This convergence correction system for the projection-type display unit has the functions of correcting not only the convergence error (color shift or drift) but also the pattern distortion.

In FIG. 5, reference numeral 10 designates a remote controller for convergence regulation operated by a convergence adjustment operator, numeral 20 a central processing unit (CPU) for controlling the system, and numeral 30 an electrically erasable & programmable read-only memory (EEPROM) for storing a convergence correction data, if any, for an adjusting point.

Further, numeral 40 designates a counter for generating a memory address corresponding to a screen position, numeral 50 a random access memory (RAM) for storing the convergence correction data for all positions on the screen, and numeral 60 a digital-to-analog converter (DAC) for converting a digital into an analog data.

Numeral 80 designates a low-pass filter (LPF) for removing high-frequency components, numeral 130 a color picture tube (CPT) for reproducing the primary colors of red, green and blue, numeral 100 a convergence yoke (CY) mounted on each CPT, numeral 90 a CY amplifier, numeral 110 a deflection circuit, and numeral 120 a deflection yoke (DY).

Numeral 140 designates a convergence regulation pattern signal generator, numeral 150 a video circuit, numeral 142 a video signal input terminal, numeral 145 a switch for transferring the input to the video circuit 150 between the output of the pattern generator 140 and the video input signal, numeral 160 a mirror, numeral 170 a screen, numeral 180 a convergence adjustment operator, and numeral 190 an interpolating device.

Numeral 70 designates a convergence correction unit including the EEPROM 30, the RAM 50, the DAC 60, the LPF 80 and the CY amplifier 90. The convergence correction unit 70 is provided for each of the CPTs of red, green and blue and also for each of the independent orthogonal two (horizontal and vertical) correction axes of a two-dimensional image on the screen, for a total of six units.

The image produced from the CPT 100 for reproducing the primary-color images of red, green and blue is projected on the screen 170 through the mirror 160 thereby to display a color image. The convergence correction of the image thus displayed is effected by the correction data stored in the RAM 50. In order to assure the appropriateness of convergence correction, it is necessary to determine a correction data required for convergence correction and store it in the RAM in advance.

The procedure for determining a correction data required for convergence correction and store it in the RAM 50 in advance will be explained. First, in order to display a reference pattern for adjustment (a lattice pattern such as cross hatched) on the screen 170, a display signal having the same pattern as a reference pattern is generated from the pattern signal generator 40 and is applied through the video circuit 150 to the CPT 100 as a video signal.

The convergence adjustment operator 180, while watching the pattern image displayed on the screen 170, operates the remote controller 10 and changes the correction data for each adjusting point in the RAM through the CPU 20 in such a manner that the pattern image coincides with the original reference pattern.

Adjusting points indicate points set as representative of a plurality of positions (points) requiring adjustment. It is necessary to prepare all the correction data for positions to be corrected, i.e., correction points between adjusting points by calculations from the correction data for the adjusting point. This offers a much more efficient method than determining the correction data by adjustment for all the positions to be corrected. In view of this, the correction data for positions to be adjusted between adjusting points are obtained by the interpolating operation using the interpolating device 190 from the correction data for these adjusting points and are stored in the RAM 50.

After that, the address corresponding to the screen position is generated at the counter 40 in synchronism with the scanning by an electron beam on the screen, and the correction data associated with the screen position is read from the RAM 50 in accordance with the address. The correction data thus read is converted into analog data by the DAC 60, and has the high-frequency components thereof removed at the LPF 80 to produce a smooth signal shaped in waveform. After that, the coil of the CY 100 is driven by the CY amplifier 90. The display position (the scanning line position of the electron beam) changes in accordance with the current flowing in the coil of the CY 100, and therefore the pattern image displayed on the screen 170 is rendered to coincide with the original reference pattern.

The adjustment is thus completed. A high-speed large-capacity RAM is used as the RAM 50. In view of the fact that the RAM is volatile and loses the contents thereof when the power supply is turned off, however, the EEPROM 30 is provided separately. After complete adjustment, only the correction data for the adjusting points in the RAM 50 are stored in the EEPROM 30. The correction data for the positions requiring correction other than adjusting points are not required to be stored since they are obtainable by calculations with the interpolating operation.

When power is switched on again, the correction data for each adjusting point is read from the EEPROM 30 instead of being used for adjustment, and by way of the interpolating operation at the interpolation device 190, the correction data for all the positions requiring correction are stored in the RAM 50. In a similar fashion, the correction data are read out of the RAM 50, and applied through the DAC 60, the LPF 80 and the CY amplifier 90 for convergence correction.

Now, a method of preparing the correction data by the interpolating operation at the interpolation device 190, which provides the most important point of the present invention, will be explained with reference to FIG. 1 taking a specific case as an example. Specifically, a method for preparing a first convergence correction data according to the present invention is shown in FIG. 1, and a method and conditions for the interpolating operation on a given vertical line (which may alternatively be a horizontal line) in FIG. 2.

Figure 1:
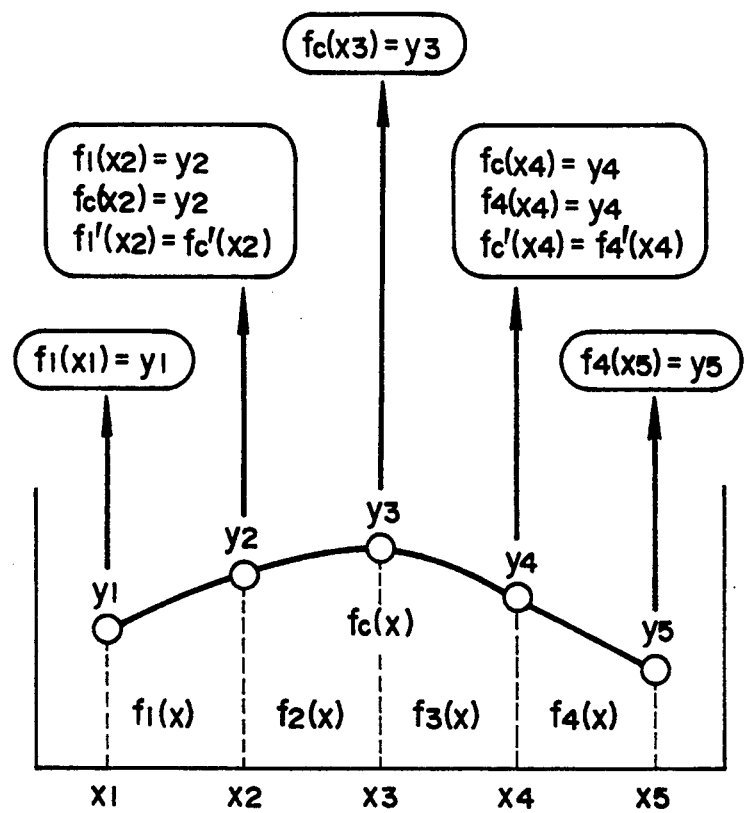
FIG. 1 is a diagram for explaining a first method of interpolation between adjusting points for convergence correction according to the present invention.

In FIG. 1, white circles designate adjusting points, character x on the abscissa the positions of the adjusting points (scanning line numbers), and character y on the ordinate the correction data for the adjusting points. When the adjusting points $x_i$ (i=1-n) in the number of n and the correction data $y_i$ (i=1-n) for the respective adjusting points are given, a section $x_1$-$x_n$ is divided into sub-sections in the number of (n−1) sandwiched between two adjusting points. In the case of FIG. 1, because the number of adjusting points is five, there are four sections.

The basic idea of the method of the interpolating operation shown in FIG. 1 is that different (independent) interpolating functions are defined for respective ones of the four sub-sections, and that the values of the interpolating functions for two sub-sections adjoining each other over an adjusting point and the values of the first order derivatives of the interpolating functions are equal to each other, respectively, at the adjusting point which constitutes a boundary of the sub-sections, with the result that the interpolating function is set in such a manner that the waveforms of adjacent interpolating functions on the opposite sides of a boundary (adjusting point) are continuous at the boundary. In this way, a plurality of interpolating functions are combined differently for different sub-sections for the purpose of securing a smooth interpolation curve fitting all the adjusting points.

Assume that each interpolating function is given by a polynomial. If the conditions for continuity are to be held with the first derivatives determined and equal to each other, each interpolating function is required to be a polynomial of at least second order. In view of the problem that the higher the order, the greater the coefficient with calculations more complicated and the curve waveform oscillatory as described above, however, each interpolating function $f_j(x)$ (j=1-n-1) is assumed as a low-order secondary function showing the conditions to be met by each interpolating function according to the method of FIG. 1.

A general equation for the secondary interpolating function is given as shown below.

$$f_j(x) = a_{j1} + a_{j2}x + a_{j3}x^2 \qquad (1)$$

Thus, the independent constants $a_{j1}$-$a_{j3}$ of interpolating functions are determined for respective sub-sections in such a manner as to satisfy the boundary conditions that the values of the interpolating functions for adjacent sub-sections and those of the first derivatives of the respective interpolating functions are equal to each other, respectively, on the opposite sides of a given adjusting point providing a boundary between sub-sections. The number of sub-sections is (n−1), where n is the number of adjusting points, and it is necessary to determine three constants for the interpolating function (secondary function) for each sub-section. Therefore, the total number of constants required to be determined is 3(n−1)=3n−3.

On the other hand, a total of only 11 conditional expressions are given for calculating the constants in the number of (3n−3) (12 in the case of FIG. 1). Such conditional expressions include two expressions representing interpolating functions for the adjusting points ($y_1$, $y_5$) at extreme ends respectively, three expressions representing the values of interpolating functions for the other adjusting points ($y_2$, $y_3$, $y_4$), three expressions of the condition that the values of the adjacent interpolating functions on the sides of each of the adjusting points are equal to each other, and three expressions of the condition that the values of the first order derivatives of the adjacent interpolating functions on the sides of each of the adjusting points are equal to each other.

More specifically, the number of the conditional expressions given for calculating 12 constants is eleven which is fewer than the constants by one in the number. Twelve constants (unknown numbers) cannot be calculated from 11 simultaneous equations. Assuming that the number of adjusting points is n, the number of sections is (n−1), and the number of the constants (unknown numbers) required to be calculated is (3n−3) while conditional expressions are given in the number of (3n−4), less than (3n−3) by one. It is thus impossible to calculate the required constants (unknown numbers).

In order to obviate this inconvenience, two continuous ones of a plurality of sub-sections are arranged to share the same interpolating function (a common interpolating function). This is indicated in FIG. 1 by the fact that the same interpolating function $y = f_c(x)$ is used for the sub-section $x_2-x_3$ and the sub-section $x_3-x_4$. By doing so, the required constants (unknown numbers) are reduced by three and can be determined appropriately. This process will be explained below.

In view of the fact that a common interpolating function is used for two continuous sub-sections, the two conditional expressions satisfying the above-mentioned boundary conditions for the related boundary (adjusting point), i.e., the requisite that the values of the interpolating functions for adjacent sub-sections and those of the first derivatives for the interpolating functions, respectively, are required to be equal to each other at an adjusting point constituting a boundary between sub-sections, loses its meaning. As a consequence, the number of the conditional expressions given is (3n−4)−2=3n−6. The constants (unknown numbers) requiring calculations also number the same (3n−3−3) and thus become calculable.

It will be understood that the case shown in FIG. 1 indicates that both the constants (unknown numbers) to be determined and the conditional expressions given number nine. Specific conditional expressions for respective adjusting points are indicated at the end of arrows directed upward. More specifically, with the number of adjusting points n at 5, the interpolating function $f_2(x)$ for the sub-section $x_2-x_3$ and the interpolating function $f_3(x)$ for the sub-section $x_3-x_4$ are given as the same interpolating function $f_c(x)$.

Two continuous sub-sections expressed by the same interpolating function may be selected at a desired point in a plurality of continuous sub-sections. Normally, however, the number n of adjusting points is often selected at an odd number for convenience of securing an adjusting point at the screen center as described above. In such a case, the two sub-sections sandwiching the center adjusting point had best be those expressed by the same interpolating function in consideration of the symmetry of the screen as a whole.

In FIG. 1, let the constants of the interpolating function (second order polynominal) for the sub-section $x_1-x_2$ be given as $a_{11}$, $a_{12}$, $a_3$, those for the sub-section $x_2-x_3$ as $a_{c1}$, $a_{c2}$, $a_{c3}$, those for the sub-section $x_3-x_4$ also as $a_{c1}$, $a_{c2}$, $a_{c3}$, and those for the sub-section $x_4-x_5$ as $a_{31}$, $a_{32}$, $a_{33}$. Then, the nine conditional expressions shown in FIG. 1 indicated in matrix are expressed as $$M_1 \cdot A = M_2 \cdot Y \qquad (2)$$

$$M = \begin{bmatrix} 1 & X_1 & X_1^2 & 0 & 0 & 0 & 0 & 0 & 0 \\ 1 & X_2 & X_2^2 & 0 & 0 & 0 & 0 & 0 & 0 \\ 0 & 0 & 0 & 1 & X_2 & X_2^2 & 0 & 0 & 0 \\ 0 & 1 & 2X_2 & 0 & -1 & -2X_2 & 0 & 0 & 0 \\ 0 & 0 & 0 & 1 & X_3 & X_3^2 & 0 & 0 & 0 \\ 0 & 0 & 0 & 1 & X_4 & X_4^2 & 0 & 0 & 0 \\ 0 & 0 & 0 & 0 & 0 & 0 & 1 & X_4 & X_4^2 \\ 0 & 0 & 0 & 0 & 1 & 2X_4 & 0 & -1 & -2X_4 \\ 0 & 0 & 0 & 0 & 0 & 0 & 1 & X_5 & X_5^2 \end{bmatrix} \qquad (3)$$

$$A = \begin{bmatrix} a_{11} \\ a_{12} \\ a_{13} \\ a_{c1} \\ a_{c2} \\ a_{c3} \\ a_{31} \\ a_{32} \\ a_{33} \end{bmatrix} \qquad (4)$$

$$M_2 = \begin{bmatrix} 1 & 0 & 0 & 0 & 0 \\ 0 & 1 & 0 & 0 & 0 \\ 0 & 1 & 0 & 0 & 0 \\ 0 & 0 & 0 & 0 & 0 \\ 0 & 0 & 1 & 0 & 0 \\ 0 & 0 & 0 & 1 & 0 \\ 0 & 0 & 0 & 1 & 0 \\ 0 & 0 & 0 & 0 & 0 \\ 0 & 0 & 0 & 0 & 1 \end{bmatrix} \qquad (5)$$

$$Y = \begin{bmatrix} y_1 \\ y_2 \\ y_3 \\ y_4 \\ y_5 \end{bmatrix} \qquad (6)$$

The equation (2) above may be changed to an equation for determining A, as shown below.

$$A = M_1^{-1} \cdot M_2 \cdot Y \qquad (7)$$

where $M^{-1}$ is the inverse matrix of the $M_1$ matrix.

The correction data between adjusting points are easily calculated by use of the F matrix shown below.

$$F = X \cdot A \tag{8}$$
$$= X \cdot (M_1^{-1} \cdot M_2 \cdot Y)$$
$$= X \cdot M_1^{-1} \cdot M_2 \cdot Y$$
$$= (X \cdot M_1^{-1} \cdot M_2) \cdot Y$$
$$= C_p \cdot Y$$

where $$F = \begin{bmatrix} f_1(x) \\ f_c(x) \\ f_4(x) \end{bmatrix} \tag{9}$$

$$X = \begin{bmatrix} 1 & X & X^2 & 0 & 0 & 0 & 0 & 0 & 0 \\ 0 & 0 & 0 & 1 & X & X^2 & 0 & 0 & 0 \\ 0 & 0 & 0 & 0 & 0 & 0 & 1 & X & X^2 \end{bmatrix} \tag{10}$$

If the elements of the F matrix thus determined are used selectively for each sub-section, a correction function is obtained.

More specifically, the correction function f(x) is expressed as $$f(x) = \begin{cases} f_1(x) & [x < x_2] \\ f_c(x) & [x_2 \leq x \leq x_4] \\ f_4(x) & [x_4 \leq x] \end{cases}$$

In this case, the equation (8) may be decomposed into elements and is expressed in the form shown below.

$$f(x) = \sum_{j=1}^{5} v_{xj} \cdot y_{rr}(j)$$

where $v_{xj}$ is a constant determined by the adjusting points and the position of the correction point to be determined, $r_y(j)$ the correction point number of the j-th adjusting point, and $y_{rr}(j)$ the correction data for the j-th adjusting point.

As to $r_y(j)$, this element indicates the number of the j-th adjusting point as a correction point. When $r_y(2) = 30$, for example, it indicates that the second adjusting point represents a position on the 30th scanning line.

As explained above, as a result of using this interpolating operation, the first order derivatives of the interpolating functions for the two adjacent sub-sections on the opposite sides of an adjusting point assume the same value at the adjusting point, so that the functional waveforms of the respective interpolating functions for these adjacent sub-sections are continuous at the adjusting point, thereby producing a smooth interpolation curve over all the adjusting points.

It is thus possible to suppress the line density modulation of the scanning line which has conventionally often occurred at an adjusting point. Also, the fact that the interpolation curve is a combination of low-order interpolating functions makes it possible to produce a correction data by simple matrix calculations. Further, because of the low order of the interpolating function, the functional waveform is not oscillatory even when the interpolating functions for the sub-sections at extreme ends are extended beyond the particular sub-sections for extrapolating operation. The error is thus prevented from increasing.

Suppose each interpolating function is the second order polynomial in the above-mentioned method. Two continuous sub-sections used for the same interpolating function have three adjusting points therein, and therefore the interpolating functions for the two sub-sections can be determined uniquely by the three conditional expressions alone. Also, when the interpolating function of one of the sub-sections adjacent to a given sub-section is determined, the value of the first order derivative of the interpolating function for the adjusting point of the boundary involved is also determined, with the result that three conditional expressions including the correction data at extreme ends of the sub-section are obtained, thereby making it possible to determine a second order interpolating function.

This is indicative of the possibility that the above-mentioned interpolating conditions are met if the interpolating function for two sub-sections using the same interpolating function is determined first, followed by determination of the interpolating functions for adjacent sub-sections sequentially. By making adjustment sequentially starting from the adjusting point for two continuous sub-sections having the same interpolating function, therefore, the correction data in the neighborhood of the adjusting point first adjusted is not affected by the correction data for an adjusting point adjusted subsequently, thereby facilitating the adjustment.

Assuming that the portions other than the Y matrix are placed in a parenthesis, the data in the parenthesis is irrelevant to the correction data at the adjusting points, and is determined only by the position (address) and the conditional expression for the correction point including an adjusting point. Once the data in the parenthesis is calculated in advance for each correction point and set in the interpolation device 190, therefore, the calculations of equation (8) are given as n sets of products of two values and the total sum thereof. A quick calculation is thus made possible when the correction data for an adjusting point undergoes a change.

When real-time calculations are possible, the X matrix and portions other than the Y matrix contained in a parenthesis, of course, require no storage in memory, but the values thereof may be determined by calculations each time.

While the foregoing case is explained with reference to the interpolating calculations for the vertical direction, similar calculations are possible also for the horizontal direction.

Figure 11:
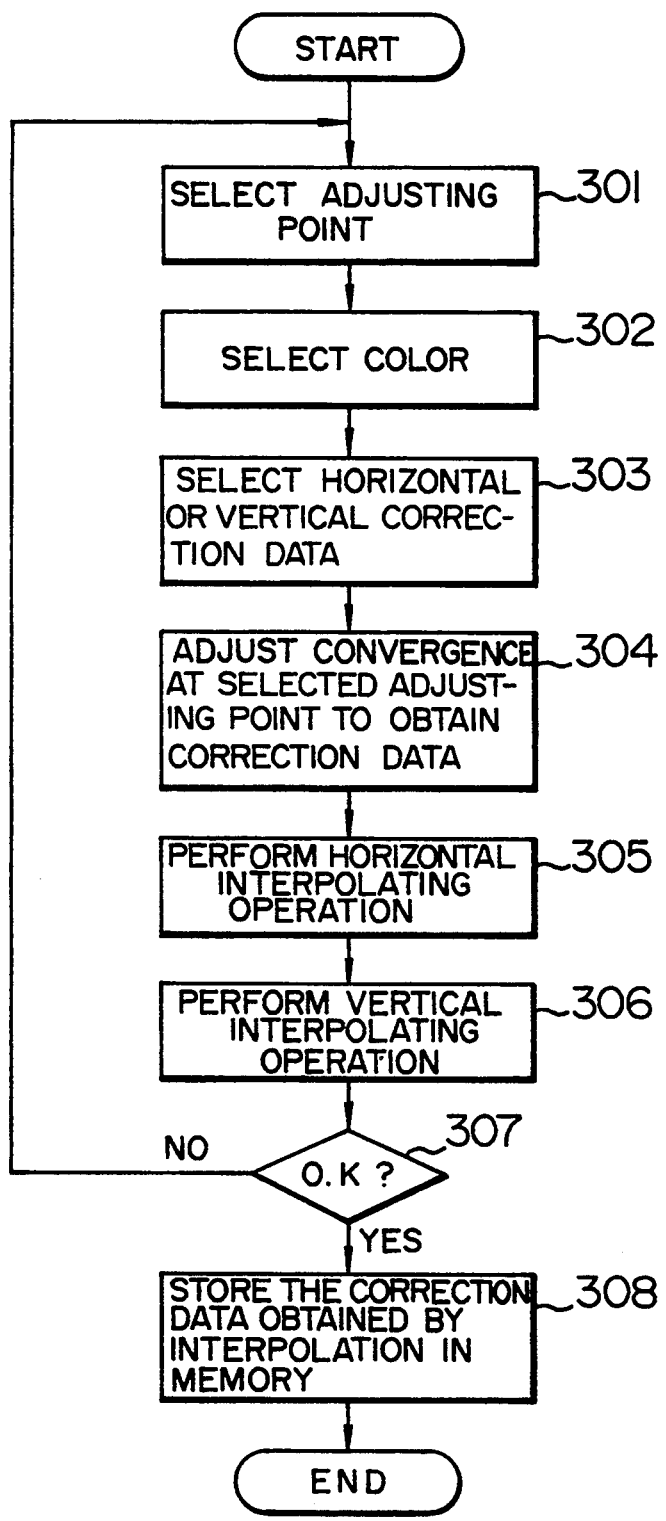
FIG. 11 is a flowchart showing an example of the method for producing a correction data on the two-dimensional plane by the interpolating operation in both horizontal and vertical directions.

FIG. 11 is a diagram showing an example of the adjustment flowchart for preparing the correction data in both horizontal and vertical directions by use of the interpolating operation mentioned above.

Figure 6:
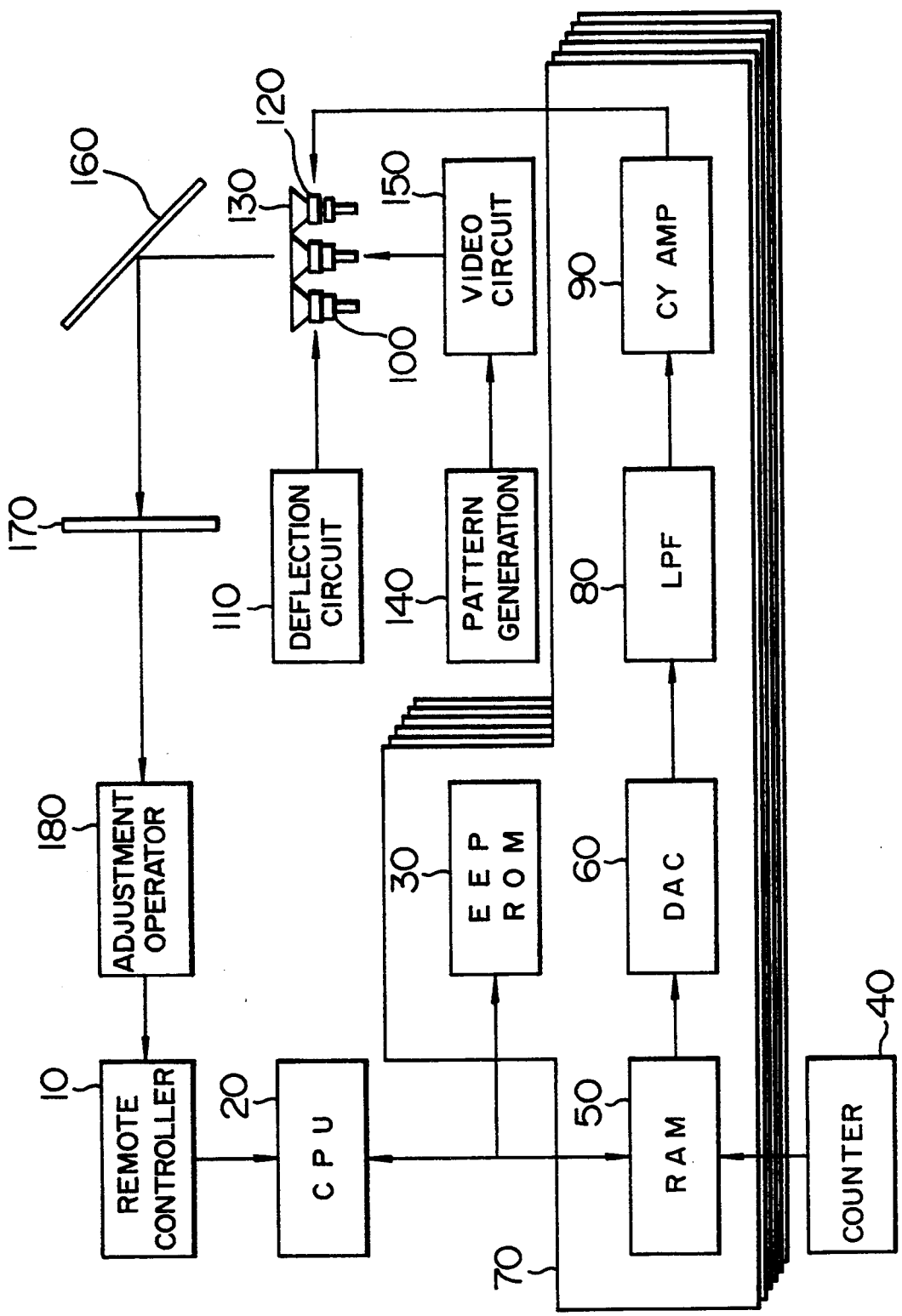
FIG. 6 is a block diagram showing a system configuration of a digital convergence correction system according to a second embodiment of the present invention.

In FIG. 6, the adjustment operator 180 first selects an adjusting point by the remote controller 10, and stores it in the RAM 50 through the CPU 20 (step 301). The CPU 20 selects the CPT, i.e., the color to be adjusted first from three CPTs 100 (step 302). Further, the horizontal or vertical correction data is selected (step 303). The adjustment operator adjusts the convergence at a selected adjusting point by the remote controller 10 and obtains a correction data (step 304). The interpolating operation device 190, on the basis of the correction data thus obtained, effects the one dimensional interpolating operation in each of the horizontal and vertical directions to realize the two-dimensional interpolation (steps 305, 306). The adjustment operator decides on the result of interpolation visually (step 307). In the case where a satisfactory convergence correction is attained by this adjustment work, the correction data for the adjusting points are stored in the EEPROM 30 (step 308), thus completing all the adjustment work. Otherwise, the control operation returns to step 1, and similar operating steps are repeated.

Figure 12:
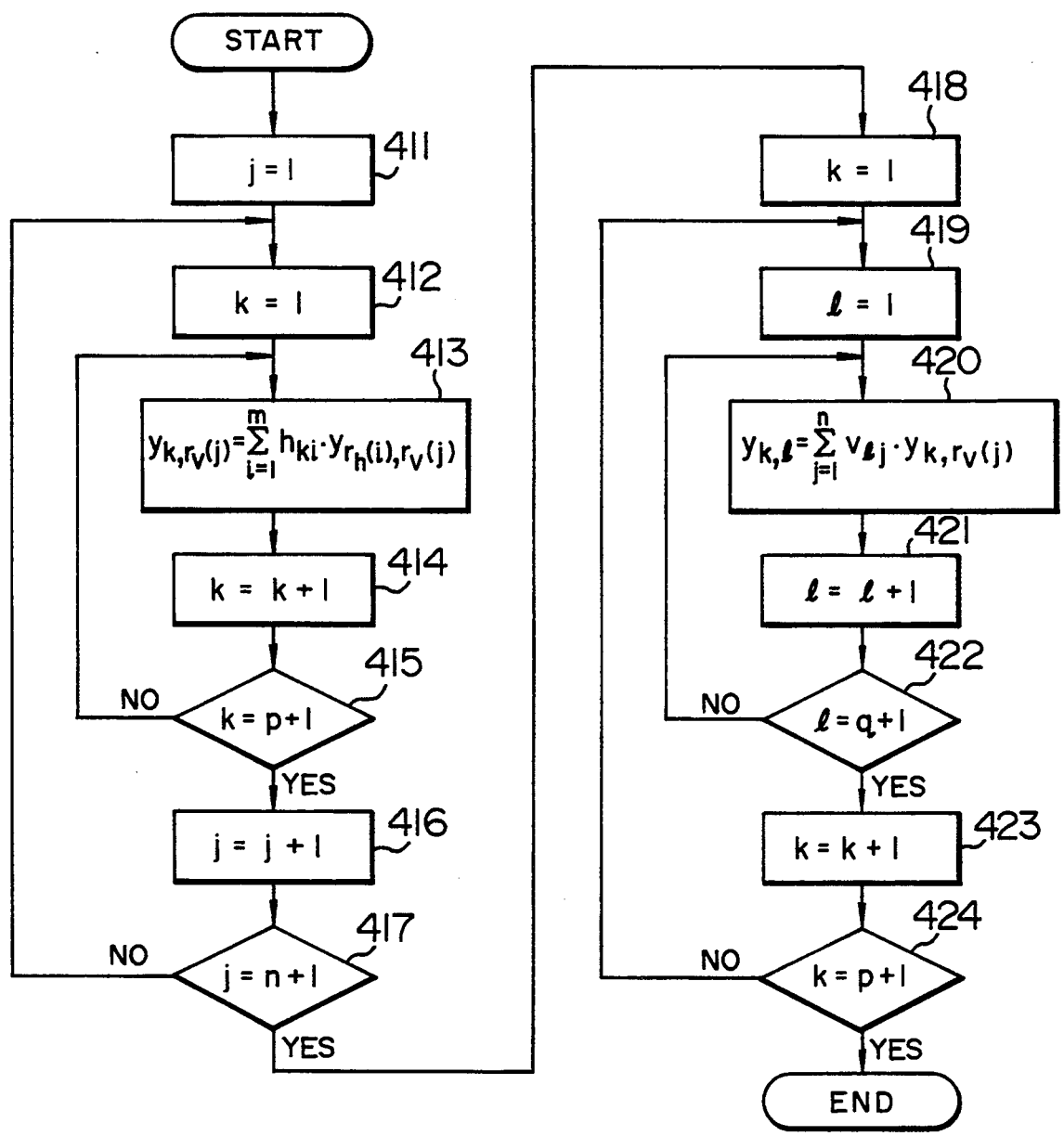
FIG. 12 is a flowchart for explaining in further detail the steps of horizontal and vertical interpolating operation in the flowchart of FIG. 11.

FIG. 12 is an example of flowchart showing the horizontal and vertical interpolating operations (steps 305, 306) of FIG. 11 in more detail.

In FIG. 12, the number of all the correction points to be determined by interpolation is assumed to be p (horizontal)×q (vertical). Also, each correction data is assumed to be $y_{k,l}$ ($1 \leq k \leq p$, $1 \leq l \leq q$), and the number of adjusting points to be m (horizontal)×n (vertical). The adjusting points are included in the correction points. Assuming that the position of the adjusting point (correction point number) for the column i and row j is $r_h(i)$, $r_v(j)$, the correction data thereof is expressed as $y_{r_h(i),r_v(j)}$. First, j is set to 1 (step 411), and k to 1 (step 412). Then, $$\sum_{i=1}^{m} h_{ki} \cdot y_{r_h(i), r_v(j)}$$

is calculated to determine $y_{k,r_v(j)}$ on condition that k=1, j=1 (step 413), where $h_{ki}$ is a constant matrix. After that, k is incremented by one (step 414), and the calculations at step 413, 414 are repeated until k reaches p+1. If step 415 decides that k has reached p+1, j is incremented by one (step 416), and the calculations at steps 412 to 416 are repeated until j reaches n+1. When step 417 decides that j has reached n+1, it indicates that all the interpolation data have been obtained for horizontal direction. The interpolation data for vertical direction is prepared by use of the horizontal interpolation data $y_{k,r_v(j)}$ obtained as above. First, k and l are set to 1 respectively (steps 418, 419). Then, $$y_{k,l} = \sum_{j=1}^{n} v_{lj} \cdot y_{k,r_v(j)}$$

is calculated (step 420), and l is incremented by one (step 421), where $v_{lj}$ is a constant. Steps 420, 421 are repeated until l reaches q+1. When step 422 decides that l has reached q+1, k is incremented by one (step 423), and the calculations of steps 419 to 423 are repeated. When step 424 decides that k has reached p+1, the interpolation data for all the correction points in vertical direction are calculated, thus completing the calculations of the interpolation data for all the correction points in both horizontal and vertical directions on the screen.

In FIG. 5, the remote controller 10, the CPU 20, the interpolation device 190 and the pattern generator 140 may be used as an independent device in the form of convergence adjuster, or the interpolation device 190 alone may be separately used as a convergence correction data preparation device.

Figure 2:
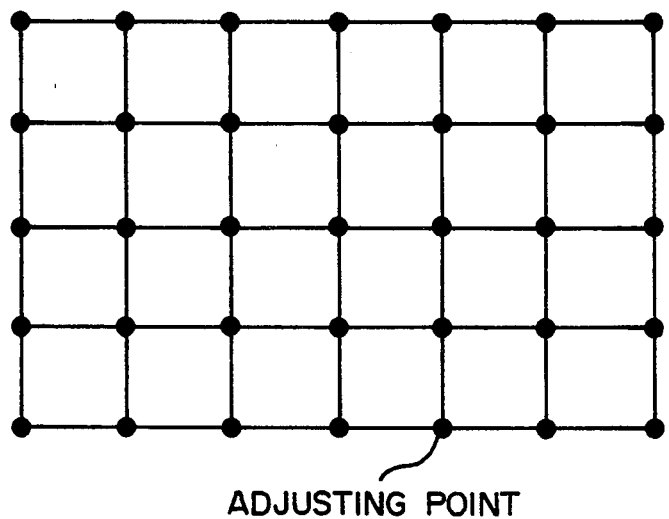
FIG. 2 is a diagram for explaining a reference pattern for convergence regulation.
Figure 3:
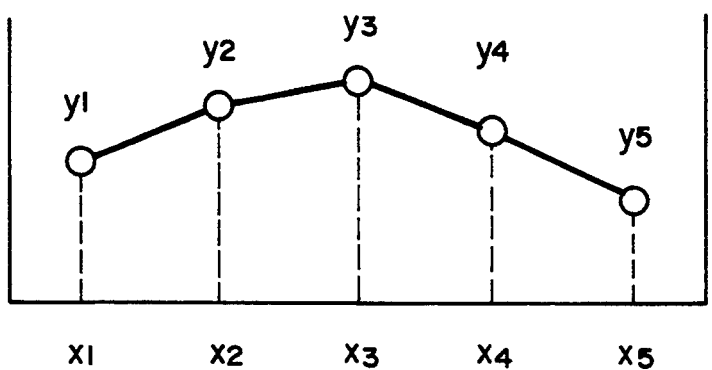
FIG. 3 is a diagram for explaining a conventional method of interpolation between adjusting points for convergence correction.
Figure 4:
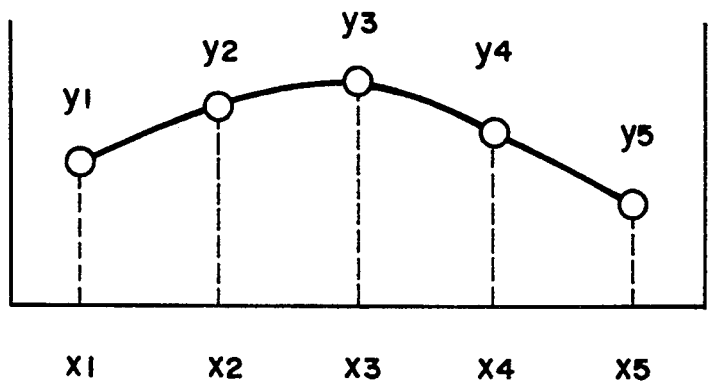
FIG. 4 is a diagram for explaining an ideal interpolation curve between adjusting points for convergence correction.
Figure 7:
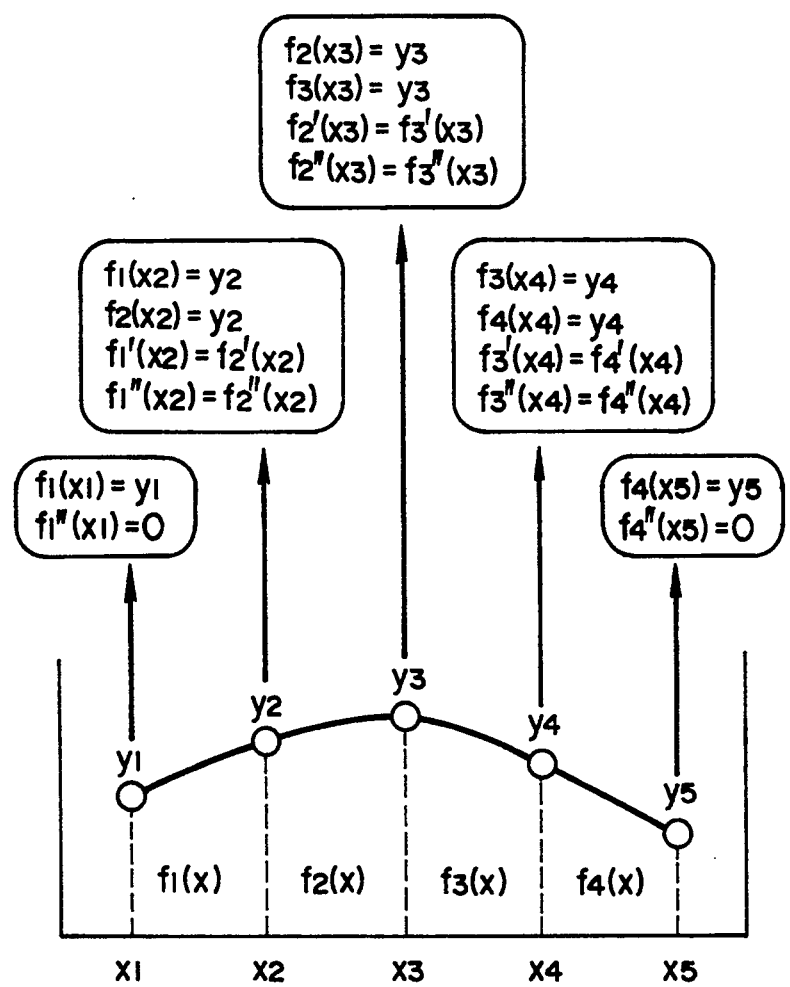
FIG. 7 is a diagram for explaining a second method of interpolation between adjusting points for convergence correction according to the present invention.

FIG. 7 is a diagram for explaining a second method of preparing convergence correction data according to the present invention. A method and conditions for the interpolating operation for a given vertical line in FIG. 2 are shown. In FIG. 7, white circles designate adjusting points, character x the position of an adjusting point (scanning line number), and character y the correction data for an adjusting point.

When a number n of adjusting points $x_i$ (i: 1-n) and the correction data $y_i$ (i: 1-n) for each adjusting point are given, a section $x_1-x_n$ is segmented into a number (n−1) of sub-sections sandwiched by two adjusting points. In the case of FIG. 7, the number of adjusting points is 5, and therefore that of sub-sections is 4.

The basic idea of the method shown in FIG. 7 is that an independent (inherently different) interpolating function is defined for each sub-section, and the interpolating functions for adjacent sub-sections are set in such a manner that the values thereof, the values of the first order derivatives and second order derivatives thereof are equal to each other, respectively, at a given adjusting point providing a boundary between the adjacent sub-sections, with the result that the waveforms of the adjacent interpolating functions are continuous in an improved fashion at the boundary (adjusting point). In this way, a plurality of different interpolating functions each for a respective sub-section are combined to produce a smoother interpolation curve covering all the adjusting points.

Assume that each interpolating function is given by a polynomial. If the continuity condition that up to the second order derivatives are determined and are equal to each other is to be held, each interpolating function, is required to be a polynomial of at least third order. With the increase in the number of order, however, the coefficients are increased in number, thereby complicating the calculations. In addition, as described above, the problem of the curve assuming an oscillatory waveform is posed. According to the method shown in FIG. 7, therefore, each interpolating function $f_j(x)$ (j: 1-n−1) is given as a third order function, and the conditions to be met for each interpolating function in such a case are shown.

A general equation for a third order interpolating function is given as $$f_j(x) = a_{j1} + a_{j2}x + a_{j3}x^2 + a_{j4}x^3 \qquad (11)$$

The constants $a_{j1}$ to $a_{j4}$ for the independent interpolating functions for respective sub-sections are determined in such a manner that the values of the interpolating functions, the values of the first order derivatives and the values of the second order derivatives for adjacent sub-sections on the opposite sides of a given adjusting point providing a boundary between sub-sections are equal to each other, respectively. The number of sub-sections is (n−1) where n is the number of adjusting points, and it is necessary to determine four constants for the interpolating function (third order polynominal) of each sub-section. Therefore, the number of constants to be determined is 4(n−1)=4n−4.

On the other hand, a total of only 14 conditional expressions are given for calculating the constants in the number of 4n−4 (16 in the case of Fig. 7). Such conditional expressions include two expressions for giving the values of interpolating functions for the adjusting points ($y_1$, $y_5$) at extreme ends in FIG. 7, and three expressions for giving the values of interpolating functions, three expressions of the condition that the values of the interpolating functions for adjacent sub-sections on the opposite sides of an adjusting point are equal to each other, three expressions of the condition that the values of the first order derivatives of adjacent interpolating functions on the opposite sides of an adjusting point are equal to each other, and three expressions of the condition that the values of the second order derivatives of each of the adjacent interpolating functions on the opposite sides of an adjusting point are equal to each other, for the other adjusting points $y_2$, $y_3$, $y_4$.

More specifically, there are only 14 conditional expressions given for calculating 16 constants, and it is impossible to determine 16 constants (unknown numbers) from 14 simultaneous equations. Assuming that n is the number of adjusting points, the number of sub-sections is $n-1$, and the number of the constants (unknown numbers) required to be calculated is $4n-4$, while there are given conditional expressions fewer by two. Since $2+4(n-2)=4n-6$, the required number of constants (unknown numbers) cannot be calculated.

In order to obviate this inconvenience, the values of the second order derivatives for the adjusting points at extreme ends (adjusting points $x_1$, $x_5$ in FIG. 7) are arbitrarily given to increase the conditional expressions by two. In FIG. 7, a versatile "0" is selected as a value of the second order derivative given arbitrarily.

It will thus be seen that there are 16 conditional expressions given against 16 constants (unknown numbers) to be determined in the case of FIG. 7. More specifically, in FIG. 7, specific conditional expressions for respective adjusting points are shown along arrows directed upward from each adjusting point. When the number n of adjusting points is assumed to be 5, the interpolating function for the sub-section $x_1$-$x_2$ is $f_1(x)$, that for the sub-section $x_2$-$x_3$ is $f_2(x)$, that for the sub-section $x_3$-$x_4$ is $f_3(x)$, and that for the sub-section $x_4$-$x_5$ is $f_4(x)$.

In FIG. 7, the constants of the interpolating function (third order polynominal) for the sub-section $x_1$-$x_2$ are given as $a_{11}$, $a_{12}$, $a_{13}$, $a_{14}$, those for the sub-section $x_2$-$x_3$ as $a_{21}$, $a_{22}$, $a_{23}$, $a_{24}$, those for the sub-section $x_3$-$x_4$ as $a_{31}$, $a_{32}$, $a_{33}$, $a_{34}$, and those for the sub-section $x_4$-$x_5$ as $a_{41}$, $a_{42}$, $a_{43}$, $a_{44}$. Under this condition, the 16 conditional expressions shown in FIG. 7 are expressed by the same form of equation as equation (2) in matrix. Although the Y matrix has the same form as equation (6), the other matrices are expressed as shown below.

$$M_1 = \begin{bmatrix} 1 & X_1 & X_1^2 & 0 & 0 & 0 & 0 & 0 & 0 & 0 & 0 & 0 & 0 & 0 & 0 & 0 \\ 0 & 0 & 2 & 6X_1 & 0 & 0 & 0 & 0 & 0 & 0 & 0 & 0 & 0 & 0 & 0 & 0 \\ 1 & X_2 & X_2^2 & X_2^3 & 0 & 0 & 0 & 0 & 0 & 0 & 0 & 0 & 0 & 0 & 0 & 0 \\ 0 & 0 & 0 & 0 & 1 & X_2 & X_2^2 & X_2^3 & 0 & 0 & 0 & 0 & 0 & 0 & 0 & 0 \\ 0 & 1 & 2X_2 & 3X_2^2 & 0 & -1 & -2X_2^2 & -3X_2^2 & 0 & 0 & 0 & 0 & 0 & 0 & 0 & 0 \\ 0 & 0 & 2 & 6X_2 & 0 & 0 & -2 & -6X_2 & 0 & 0 & 0 & 0 & 0 & 0 & 0 & 0 \\ 0 & 0 & 0 & 0 & 1 & X_3 & X_3^2 & X_3^3 & 0 & 0 & 0 & 0 & 0 & 0 & 0 & 0 \\ 0 & 0 & 0 & 0 & 0 & 0 & 0 & 0 & 1 & X_3 & X_3^2 & X_3^3 & 0 & 0 & 0 & 0 \\ 0 & 0 & 0 & 0 & 0 & 1 & 2X_3 & 3X_3^2 & 0 & -1 & -2X_3 & -3X_3^2 & 0 & 0 & 0 & 0 \\ 0 & 0 & 0 & 0 & 0 & 0 & 2 & 6X_3 & 0 & 0 & -2 & -6X_3 & 0 & 0 & 0 & 0 \\ 0 & 0 & 0 & 0 & 0 & 0 & 0 & 0 & 1 & X_4 & X_4^2 & X_4^3 & 0 & 0 & 0 & 0 \\ 0 & 0 & 0 & 0 & 0 & 0 & 0 & 0 & 0 & 0 & 0 & 1 & X_4 & X_4^2 & X_4^3 \\ 0 & 0 & 0 & 0 & 0 & 0 & 0 & 0 & 0 & 1 & 2X_4 & 3X_4^2 & 0 & -1 & -2X_4 & -3X_4^2 \\ 0 & 0 & 0 & 0 & 0 & 0 & 0 & 0 & 0 & 0 & 2 & 6X_4 & 0 & 0 & -2 & -6X_4 \\ 0 & 0 & 0 & 0 & 0 & 0 & 0 & 0 & 0 & 0 & 0 & 0 & 1 & X_5 & X_5^2 & X_5^3 \\ 0 & 0 & 0 & 0 & 0 & 0 & 0 & 0 & 0 & 0 & 0 & 0 & 0 & 0 & 2 & 6X_5 \end{bmatrix} \quad (12)$$

$$A = \begin{bmatrix} a_{11} \\ a_{12} \\ a_{13} \\ a_{14} \\ a_{21} \\ a_{22} \\ a_{23} \\ a_{24} \\ a_{31} \\ a_{32} \\ a_{33} \\ a_{34} \\ a_{41} \\ a_{42} \\ a_{43} \\ a_{44} \end{bmatrix} \quad (13)$$

$$M_2 = \begin{bmatrix} 1 & 0 & 0 & 0 & 0 \\ 0 & 0 & 0 & 0 & 0 \\ 0 & 1 & 0 & 0 & 0 \\ 0 & 1 & 0 & 0 & 0 \\ 0 & 0 & 0 & 0 & 0 \\ 0 & 0 & 0 & 0 & 0 \\ 0 & 0 & 1 & 0 & 0 \\ 0 & 0 & 1 & 0 & 0 \\ 0 & 0 & 0 & 0 & 0 \\ 0 & 0 & 0 & 0 & 0 \\ 0 & 0 & 0 & 1 & 0 \\ 0 & 0 & 0 & 1 & 0 \\ 0 & 0 & 0 & 0 & 0 \\ 0 & 0 & 0 & 0 & 0 \\ 0 & 0 & 0 & 0 & 1 \\ 0 & 0 & 0 & 0 & 0 \end{bmatrix} \quad (14)$$

It is thus possible to determine each correction data (adjustment data) by modifying the equations as shown in equation (8). The F and X matrices, however, are expressed as $$F = \begin{bmatrix} f_1(x) \\ f_2(x) \\ f_3(x) \\ f_4(x) \end{bmatrix} \quad (15)$$

$$X = \begin{bmatrix} 1 & X & X^2 & X^3 & 0 & 0 & 0 & 0 & 0 & 0 & 0 & 0 & 0 & 0 & 0 & 0 \\ 0 & 0 & 0 & 0 & 1 & X & X^2 & X^3 & 0 & 0 & 0 & 0 & 0 & 0 & 0 & 0 \\ 0 & 0 & 0 & 0 & 0 & 0 & 0 & 0 & 1 & X & X^2 & X^3 & 0 & 0 & 0 & 0 \\ 0 & 0 & 0 & 0 & 0 & 0 & 0 & 0 & 0 & 0 & 0 & 0 & 1 & X & X^2 & X^3 \end{bmatrix} \quad (16)$$

If the elements of the F matrix thus determined are selectively used for each sub-section, they constitute a correction function. The use of the method for interpolating operation according to this embodiment makes a very smoothly continuous waveform of the interpolating functions between sub-sections due to the fact that the values of the first and second order derivatives of the interpolating functions for adjacent two sub-sections on the opposite sides of an adjusting point are equal to each other, respectively, at the adjusting point. As a result, it is possible to obtain an almost ideal interpolation curve which is very smooth over all the adjusting points.

The line density modulation of the scanning line which easily occurred conventionally at an adjusting point is thus effectively suppressed. Also, correction data is obtained by simple matrix calculations. Further, the fact that the interpolating function is comparatively low in the number of order and the second order derivatives for adjusting points at extreme ends, that is, the change in the inclination of the interpolation curve for the adjusting points at ends is set to zero, the functional waveform is prevented from becoming oscillatory and the error is kept small, even when the interpolating function for a sub-section at an end is extended beyond that sub-section for extrapolating operation.

Figure 8:
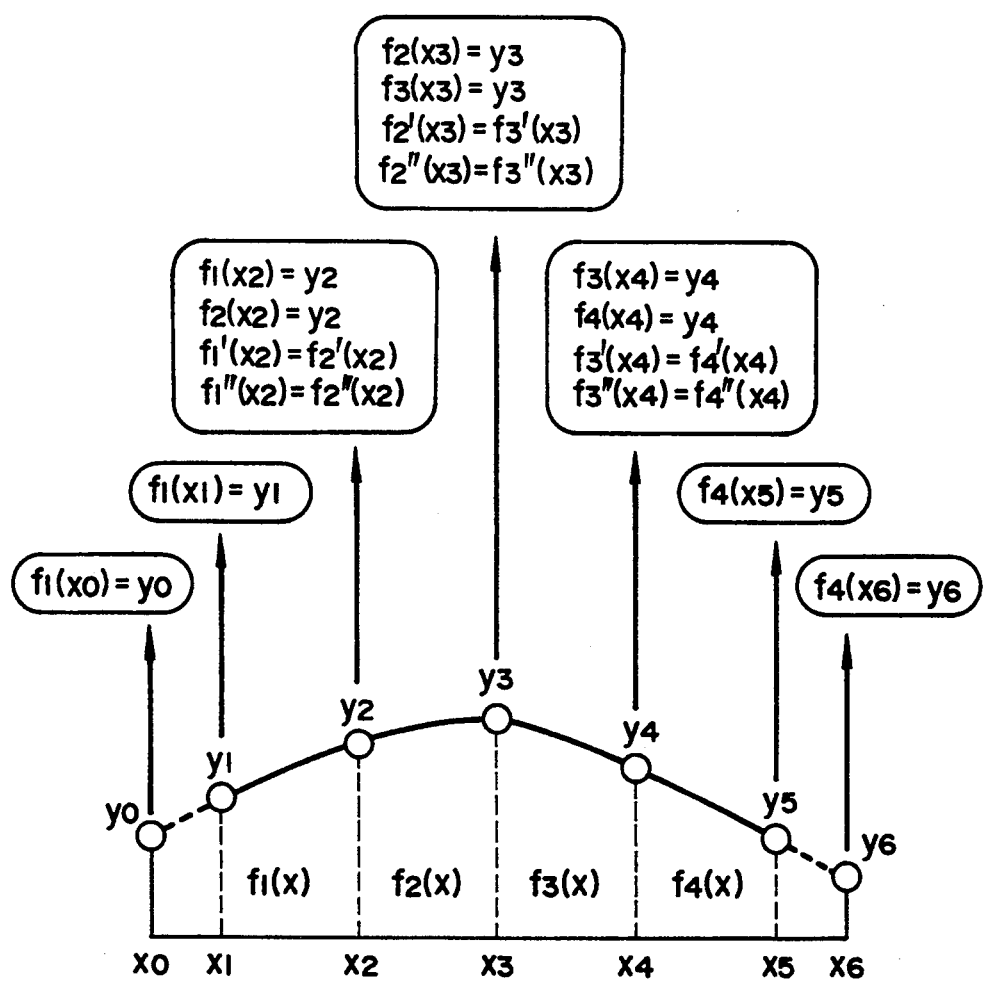
FIG. 8 is a diagram for explaining a third method of interpolation between adjusting points for convergence correction according to a third embodiment of the present invention.

FIG. 8 is a diagram for explaining a third method of preparing the convergence correction data according to the present invention. This diagram illustrates a method and conditions for the interpolating operation on a given vertical line in FIG. 2. In FIG. 8, white circles designate adjusting points, character x the position of an adjusting point (scanning line number), and character y the correction data for an adjusting point.

When n adjusting points $x_i$ (i: 1–n) and correction data $y_i$ (i: 1–n) for each adjusting point are given, the section $x_1$-$x_n$ is divided into n−1 sub-sections sandwiched by two adjusting points. In the case of FIG. 8, the number of adjusting points is 5, and that of sub-sections 4.

The basic idea of the method shown in FIG. 8 is the same as that of the method shown in FIG. 7. Two more conditional expressions, therefore, are required regardless of the number n of adjusting points. Otherwise, no constants could be obtained. In order to obviate this inconvenience, two hypothetical adjusting points are provided and the correction data for these points are given to increase the number of conditional expressions by two and determine constants. In FIG. 8, $x_0$ and $x_6$ constitute such hypothetical adjusting points.

The conditional expressions (shown along arrows directed upward for each adjusting point in FIG. 8) thus obtained are indicated in matrix in the same form as equation (2) described above. Apart from the A matrix indicated by equation (13), the other matrices are expressed as shown below.

$$M_1 = \begin{bmatrix} 1 & X_0 & X_0^2 & X_0^3 & 0 & 0 & 0 & 0 & 0 & 0 & 0 & 0 & 0 & 0 & 0 & 0 \\ 0 & X_1 & X_1^2 & X_1^3 & 0 & 0 & 0 & 0 & 0 & 0 & 0 & 0 & 0 & 0 & 0 & 0 \\ 1 & X_2 & X_2^2 & X_2^3 & 0 & 0 & 0 & 0 & 0 & 0 & 0 & 0 & 0 & 0 & 0 & 0 \\ 0 & 0 & 0 & 0 & 1 & X_2 & X_2^2 & X_2^3 & 0 & 0 & 0 & 0 & 0 & 0 & 0 & 0 \\ 0 & 1 & 2X_2 & 3X_2^2 & 0 & -1 & -2X_2 & -3X_2^2 & 0 & 0 & 0 & 0 & 0 & 0 & 0 & 0 \\ 0 & 0 & 2 & 6X_2 & 0 & 0 & -2 & -6X_2 & 0 & 0 & 0 & 0 & 0 & 0 & 0 & 0 \\ 0 & 0 & 0 & 0 & 1 & X_3 & X_3^2 & X_3^3 & 0 & 0 & 0 & 0 & 0 & 0 & 0 & 0 \\ 0 & 0 & 0 & 0 & 0 & 0 & 0 & 0 & 1 & X_3 & X_3^2 & X_3^3 & 0 & 0 & 0 & 0 \\ 0 & 0 & 0 & 0 & 0 & 1 & 2X_3 & 3X_3^2 & 0 & -1 & -2X_3 & -3X_3^2 & 0 & 0 & 0 & 0 \\ 0 & 0 & 0 & 0 & 0 & 0 & 2 & 6X_3 & 0 & 0 & -2 & -6X_3 & 0 & 0 & 0 & 0 \\ 0 & 0 & 0 & 0 & 0 & 0 & 0 & 0 & 1 & X_4 & X_4^2 & X_4^3 & 0 & 0 & 0 & 0 \\ 0 & 0 & 0 & 0 & 0 & 0 & 0 & 0 & 0 & 0 & 0 & 0 & 1 & X_4 & X_4^2 & X_4^3 \\ 0 & 0 & 0 & 0 & 0 & 0 & 0 & 0 & 0 & 1 & 2X_4 & 3X_4^2 & 0 & -1 & -2X_4 & -3X_4^2 \\ 0 & 0 & 0 & 0 & 0 & 0 & 0 & 0 & 0 & 2 & 6X_4 & 0 & 0 & -2 & -6X_4 \\ 0 & 0 & 0 & 0 & 0 & 0 & 0 & 0 & 0 & 0 & 0 & 1 & X_5 & X_5^2 & X_5^3 \\ 0 & 0 & 0 & 0 & 0 & 0 & 0 & 0 & 0 & 0 & 0 & 1 & X_6 & X_6^2 & X_6^3 \end{bmatrix}$$

(17)

$$M_2 = \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 1 & 0 & 0 & 0 & 0 \\ 0 & 0 & 0 & 0 & 0 & 0 & 0 \\ 0 & 0 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 1 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 1 & 0 & 0 \\ 0 & 0 & 0 & 0 & 1 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 1 & 0 \\ 0 & 0 & 0 & 0 & 0 & 0 & 1 \end{bmatrix}$$

(18)

$$Y = \begin{bmatrix} y_0 \\ y_1 \\ y_2 \\ y_3 \\ y_4 \\ y_5 \\ y_6 \end{bmatrix}$$

(19)

It is thus possible to determine each correction data by modifying the equations as shown in equation (8). In spite of this, the F and X matrices are expressed by equations (15) and (16), respectively. If the elements of the F matrix thus obtained are used selectively for each sub-section, a correction function is constituted.

The two hypothetical adjusting points added above may be at any position on calculations. Since the curve passing through n adjusting points is liable to oscillate beyond the range of $x_1$-$x_n$, however, the hypothetical adjusting points are appropriately set outside of the original adjusting points. The interpolating functions for the nearest sub-sections are used for the two outside correction data.

The addition of hypothetical adjusting points increases the ranks of the $M_2$ and Y matrices. The correction data for the hypothetical adjusting points, therefore, may be given as the sum of products of $y_1$-$y_n$ and constants, i.e., the linear combination of the correction data $y_1$-$y_n$ for the adjusting points. In such a case, the Y matrix is given by equation (6) above, and the $M_2$ matrix assumes the same size as in the method shown in FIG. 7. The value of $Y_0$ as determined from $y_1$ and $y_2$, and the value of $y_6$ determined from $y_5$ and $y_4$ by linear approximation, for example, are expressed as shown below.

$$y_0 = \frac{x_0 - x_2}{x_1 - x_2} \cdot y_1 + \frac{x_0 - x_1}{x_2 - x_1} \cdot y_2 \quad (20)$$
$$= C_{01}y_1 + C_{02}y_2$$

$$y_6 = \frac{x_6 - x_5}{x_4 - x_5} \cdot y_4 + \frac{x_6 - x_4}{x_5 - x_4} \cdot y_5 \quad (21)$$
$$= C_{64}y_4 + C_{65}y_5$$

The $M_2$ matrix, on the other hand, is given as follows.

$$M_2 = \begin{bmatrix} c_{01} & c_{02} & 0 & 0 & 0 \\ 1 & 0 & 0 & 0 & 0 \\ 0 & 1 & 0 & 0 & 0 \\ 0 & 1 & 0 & 0 & 0 \\ 0 & 0 & 0 & 0 & 0 \\ 0 & 0 & 0 & 0 & 0 \\ 0 & 0 & 1 & 0 & 0 \\ 0 & 0 & 1 & 0 & 0 \\ 0 & 0 & 0 & 0 & 0 \\ 0 & 0 & 0 & 0 & 0 \\ 0 & 0 & 0 & 1 & 0 \\ 0 & 0 & 0 & 1 & 0 \\ 0 & 0 & 0 & 0 & 0 \\ 0 & 0 & 0 & 0 & 0 \\ 0 & 0 & 0 & 0 & 1 \\ 0 & 0 & 0 & c_{64} & c_{65} \end{bmatrix} \quad (22)$$

By using the method of interpolation according to this embodiment, as in the second interpolation method described above with reference to FIG. 7, the values of the first order derivatives and the second order derivatives of the interpolating functions for two sub-sections adjoining over an adjusting point are equal to each other, respectively, at the adjusting point and the waveforms of the interpolating functions for these sub-sections are continuous at the adjusting point. Therefore, an almost ideal, very smooth interpolation curve is obtained over all the adjusting points.

As a consequence, the line density modulation of the scanning line is suppressed very effectively. Also, in view of the fact that the interpolation curve is a combination of interpolating functions of comparatively low order, the correction data is obtained with simple matrix calculations. Further, owing to the existence of hypothetical adjusting points given outside a section, there is no sudden change in function values even when the interpolating function of a sub-section at an extreme end is extended beyond the section for an extrapolating operation which is virtually an interpolating function, thereby improving the reliability of the extrapolation.

Figure 9:
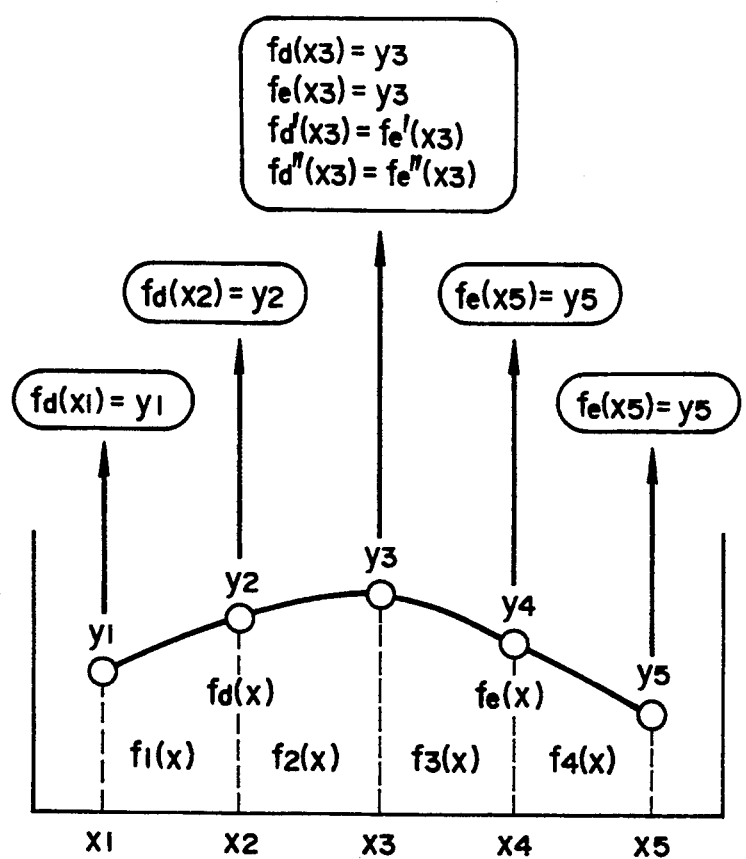
FIG. 9 is a diagram for explaining a fourth method of interpolation between adjusting points for convergence correction according to the present invention.

FIG. 9 is a diagram for explaining a fourth example of the method of preparing convergence correction data according to the present invention. The method and conditions for the interpolating operation are shown for a vertical line in FIG. 2. In FIG. 9, white circles represent adjusting points, character x the position of an adjusting point (scanning line number), and character y the correction data for the adjusting points.

When n adjusting points $x_i$ (i: =1-n) and the correction data $y_i$ (i: 1-n) for the adjusting points are given, the section $x_1$-$x_n$ is segmented into (n−1) sub-sections. In the case of FIG. 9, the number of adjusting points is 5, and that of sub-sections 4.

The basic idea of the method shown in FIG. 9 is that, as in the case of FIG. 7, the number of conditional expressions is fewer than needed by two regardless of the number n of the adjusting points, and the constants could not be obtained. In order to obviate this inconvenience, a common interpolating function is used for two sets of continuous sub-sections. In FIG. 9, the sub-sections $x_1$-$x_2$, $x_2$-$x_3$ and $x_3$-$x_4$, $x_4$-$x_5$ constitute such continuous sub-sections. In this case, the number of constants to be determined is given as $4(n-3)=4n-12$ since the number of independent interpolating functions for the sub-sections is reduced by two.

On the other hand, by using the same interpolating function, the conditions for continuity in the values of the interpolating function, the first order derivative and the second order derivative at the boundary lose importance. There are two such adjusting points, and therefore, the number of conditional expressions is given as $2+4(n-4)+2=4n-12$.

It will be seen from the above explanation that the number of constants to be determined coincides with that of the conditional expressions required, and therefore each constant can be determined. When the conditional expressions (those indicated for each adjusting point along the arrows directed upward) in FIG. 9 are indicated in matrix, the same form as equations (2) and (8) is obtained. Although the Y matrix is indicated by equation (6), however, the other matrices are expressed as shown below.

$$M_1 = \begin{bmatrix} 1 & X_1 & X_1^2 & X_1^3 & 0 & 0 & 0 & 0 \\ 1 & X_2 & X_2^2 & X_2^3 & 0 & 0 & 0 & 0 \\ 1 & X_3 & X_3^2 & X_3^3 & 0 & 0 & 0 & 0 \\ 0 & 0 & 0 & 0 & 1 & X_3 & X_3^2 & X_3^3 \\ 0 & 1 & 2X_3 & 3X_3^2 & 0 & -1 & -2X_3 & -3X_3^2 \\ 0 & 0 & 2 & 6X_3 & 0 & 0 & -2 & -6X_3 \\ 0 & 0 & 0 & 0 & 1 & X_4 & X_4^2 & X_4^3 \\ 0 & 0 & 0 & 0 & 1 & X_5 & X_5^2 & X_5^3 \end{bmatrix} \quad (23)$$

$$A = \begin{bmatrix} a_{d1} \\ a_{d2} \\ a_{d3} \\ a_{d4} \\ a_{e1} \\ a_{e2} \\ a_{e3} \\ a_{e4} \end{bmatrix} \quad (24)$$

$$M_2 = \begin{bmatrix} 1 & 0 & 0 & 0 & 0 \\ 0 & 1 & 0 & 0 & 0 \\ 0 & 0 & 1 & 0 & 0 \\ 0 & 0 & 1 & 0 & 0 \\ 0 & 0 & 0 & 0 & 0 \\ 0 & 0 & 0 & 0 & 0 \\ 0 & 0 & 0 & 1 & 0 \\ 0 & 0 & 0 & 0 & 1 \end{bmatrix} \quad (25)$$

$$F = \begin{bmatrix} f_d(x) \\ f_e(x) \end{bmatrix} \quad (26)$$

$$X = \begin{bmatrix} 1 & x & x^2 & x^3 & 0 & 0 & 0 & 0 \\ 0 & 0 & 0 & 0 & 1 & x & x^2 & x^3 \end{bmatrix} \quad (27)$$

By using the interpolation method according to the present embodiment, as in the second interpolation method described above with reference to FIG. 7, the first and second order derivatives for two sub-sections sandwiching an adjusting point are equal to each other, respectively, at the adjusting point, and the waveform of the interpolating functions for these sub-sections is very smoothly continuous at that adjusting point. Therefore, it is possible to obtain an almost ideal interpolation curve which is smooth over all the adjusting points.

For this reason, the line density modulation of the scanning line at an adjusting point is suppressed very effectively. Also, the fact that the interpolation curve is a combination of comparatively low-order interpolating functions makes it possible to determine correction data by simple matrix calculations. Further, since the matrix is small considering the number of the adjusting points, the calculations are easy, thereby making this embodiment suitable for application to a case involving comparatively many adjusting points.

FIG. 6 is a block diagram showing a system configuration of the digital convergence correction system according to a second embodiment of the present invention. This convergence correction system is for projection-type display unit and has the functions of correcting not only the convergence error (color drift) but also the pattern distortion.

The embodiment shown in FIG. 6, which has substantially the same configuration as the embodiment shown in FIG. 5, is different from the latter only in that the interpolation device 190 is lacking. More specifically, the embodiment of FIG. 6 is such that the CPU 20, instead of the interpolation device 190, executes the interpolating function. The method and operation of interpolation are substantially identical to those of the embodiment shown in FIG. 5.

Figure 10:
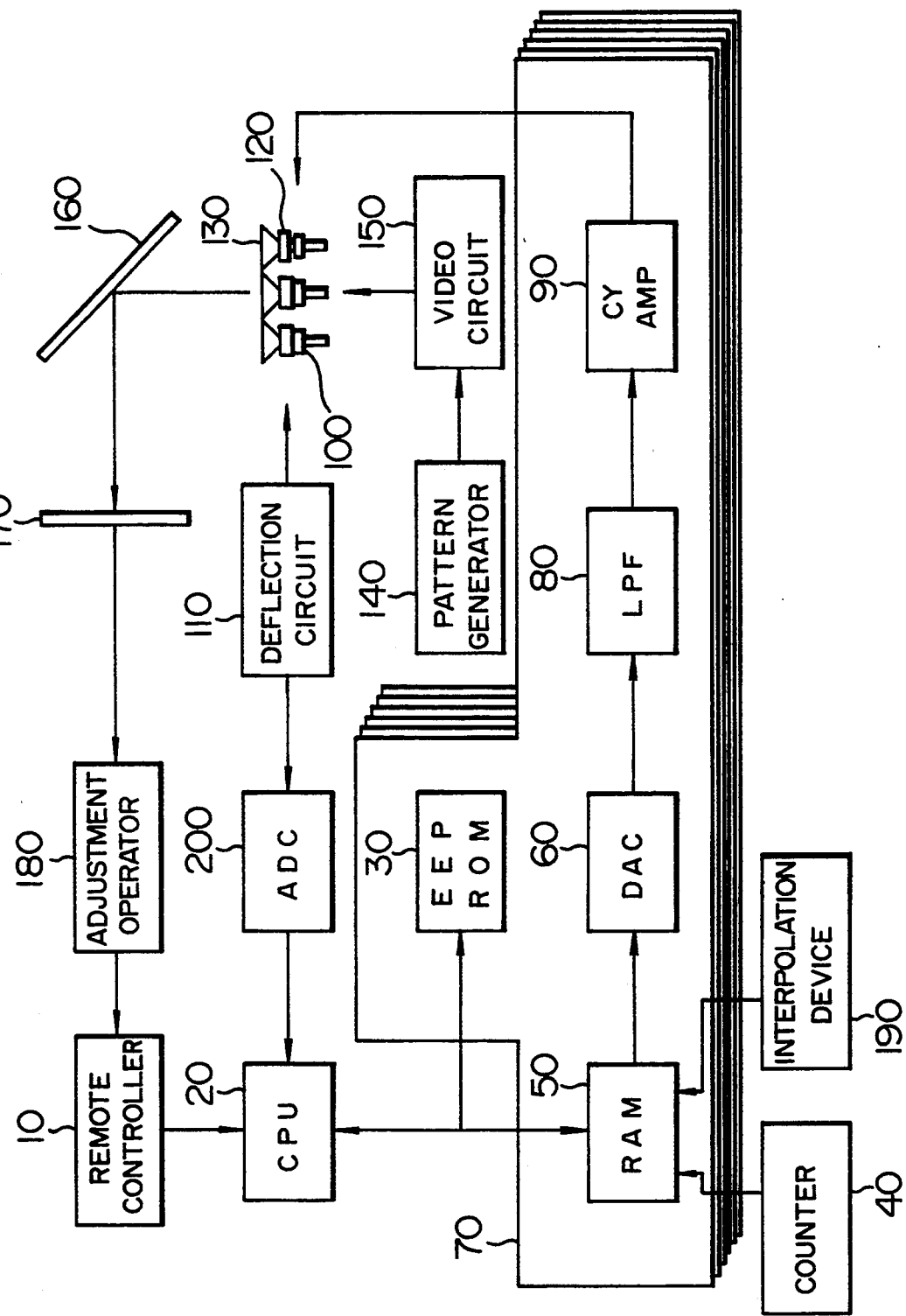
FIG. 10 is a block diagram showing a system configuration of a digital convergence correction system according to a third embodiment of the present invention.

FIG. 10 is a block diagram showing a system configuration of a digital convergence correction system according to a third embodiment of the present invention. This convergence correction system is for the projection-type display unit and has the functions of correcting both the convergence error (color drift) and the pattern distortion.

The embodiment shown in FIG. 10 has substantially the same configuration as the embodiment of FIG. 5, the difference being that the embodiment of Fig. 10 includes an ADC (analog-digital converter) 200. The embodiments of FIGS. 5 and 6 use a predetermined scanning line number and an address for adjusting points and correction points as interpolation variables. These variables are amounts changing substantially linearly with the time, and it may be considered that the time is used as an interpolation variable.

The embodiment shown in FIG. 10 uses a deflection current as an interpolation variable instead of time. In a multiscan display unit or a display unit with a variable aspect ratio (multimode display unit), the time and the screen position do not necessarily uniquely correspond to each other. Nevertheless, the deflection current uniquely corresponds to the screen position regardless of the deflection frequency or raster size.

In order to effect the interpolating operation corresponding to the image position faithfully, the deflection current value at each adjusting point is stored together with the correction data for each adjusting point after adjustment, and the correction data corresponding to the deflection current value for each correction point are determined by an interpolation method similar to that mentioned above with the deflection current as a variable.

Further, in a multimode display unit, the correction data and the deflection current for each adjusting point are stored in memory, the deflection current for each adjusting point is measured again after mode switching, and the same interpolation method as described above is used with the deflection current as a variable. According to this embodiment, the adjustment and the correction data for a multimode display unit are unified.

It will thus,be understood from the foregoing description that according to the present invention, in the digital convergence correction, in view of the fact that an interpolation curve connecting a plurality of adjusting points is a smooth correction curve made up of a combination of low-order interpolating functions, the calculation of each interpolating function is so easy that the correction data is not changed suddenly and the error is prevented from increasing even when an extrapolating calculation is conducted.

Also, the interpolation with a low-order function curve leads to the absence of an oscillatory waveform, and therefore there is only a small error against an ideal correction data. Further, the first order derivatives and second order derivatives of the interpolating functions for sub-sections are continuous between adjacent sub-sections, so that the general interpolation curve connecting all the adjusting points is smooth, thereby very effectively suppressing the line density modulation of the scanning line at an adjusting point.

We claim:

1. A digital convergence correction system used for convergence correction on a screen of a display unit including at least a cathode ray tube, comprising:

first memory means for storing convergence correction data for a plurality convergence adjusting points selected at predetermined intervals on the screen;

interpolating operation means for preparing correction data for a plurality of correction points between adjacent adjusting points by an interpolating operation from the correction data read from the first memory means;

second memory means for storing the correction data for the adjusting points and the correction data obtained by the interpolating operation;

means for generating a memory address associated with each position on the screen in synchronism with the scanning line and reading correction data associated with each screen position from the second memory means in accordance with the memory address; and means for converting said correction data read into an analog signal and driving a convergence yoke of the cathode ray tube, wherein the interpolating operation is a combination of one-dimensional interpolating operations for horizontal and vertical directions on the screen, each of a plurality of sets of adjacent adjusting points on a section subjected to the interpolating operation in each of horizontal and vertical directions on the screen defines a sub-section, and wherein each one-dimensional interpolating operation sets an interpolating function for determining correction data for a plurality of correction points in each sub-section in such a manner that:

values of interpolating functions for two adjacent sub-sections sandwiching an adjusting point are equal to each other at said adjusting point, and values of at least the first order derivatives of the interpolating functions for the two adjacent sub-sections sandwiching the adjusting point are also equal to each other at said adjusting point.

2. A digital convergence correction system according to claim 1, wherein each of the interpolating functions is a second order function.

3. A digital convergence correction system according to claim 1, wherein each of the interpolating functions is a third order function, and the interpolating functions for two adjacent sub-sections sandwiching an adjusting point have second order derivatives thereof equal to each other in value at said adjusting point.

4. A digital convergence correction system according to claim 1, wherein the interpolating operation means includes means for determining, for each section subjected to the interpolating operation, a constant matrix specific to each of a plurality of coordinate positions of a plurality of correction points including a plurality of adjusting points in said section and calculating the interpolating function matrix with each element thereof providing an interpolating function for a sub-section by multiplying the constant matrix by an adjustment data matrix given from an adjustment operator for a plurality of said adjusting points.

5. A digital convergence correction system according to claim 1, further comprising a central processing unit for controlling an operation of the convergence correction system, wherein said central processing unit includes said interpolating operation means.

6. A digital convergence correction system according to claim 1, wherein an interpolation variable used for the interpolating operation is an arbitrary one of time related to the scanning of the scanning line, the memory address and scanning line number.

7. A digital convergence correction system according to claim 1, further comprising means for detecting a deflection current of the cathode ray tube, wherein an interpolation variable used for the interpolating operation is a detected value of the deflection current.

8. A digital convergence correction system according to claim 1, wherein the interpolating operation by the interpolating operation means includes one of interpolation and extrapolation.

9. A digital convergence correction system according to claim 1, further comprising means for permitting an adjustment operator to fetch correction data at each convergence adjusting point by adjustment work and storing the correction data in first memory means.

10. A digital convergence correction system according to claim 2, wherein the interpolating functions for a predetermined set of adjacent two sub-sections in a section subjected to interpolation are expressed by a same interpolation function.

11. A digital convergence correction system according to claim 10, wherein said predetermined set of said adjacent two sub-sections are positioned substantially at the center of a range of the section subjected to interpolation.

12. A digital convergence correction system according to claim 3, wherein the values of the second order derivatives of the interpolating functions for sub-sections at ends of the section subjected to interpolation are set to zero at the adjusting points at said ends.

13. A digital convergence correction system according to claim 3, wherein a hypothetical adjusting point is provided outside of each end of the section subjected to interpolation, and correction data for the hypothetical adjusting point is set in accordance with the interpolating function for a sub-section at said end.

14. A digital convergence correction system according to claim 13, wherein the correction data for the hypothetical adjusting point is given as the sum of the products of the correction data for each adjusting point and a predetermined constant.

15. A digital convergence correction system according to claim 3, wherein the interpolating functions for two sets of adjacent two sub-sections in the section subjected to interpolation are the same function.

16. A convergence correction data preparation system used for convergence correction on a screen of a display unit including at least one cathode ray tube, comprising:

memory means for storing correction data at each of a plurality of convergence adjusting points selected at predetermined intervals on the screen; and interpolating operation means for preparing the correction data by an interpolating operation at predetermined correction point between adjusting points using the correction data for the adjusting points read from the memory means;

wherein said interpolating operation is a combination of one-dimensional interpolating operations associated with horizontal and vertical directions respectively on the screen, each set of adjacent adjusting points on a section subjected to interpolation in each of horizontal and vertical directions on the screen defines a sub-section, and wherein each one-dimensional interpolating operation sets correction data at correction points in the sub-section in such a manner that values of interpolating functions for adjacent two sub-sections sandwiching and adjusting point match each other at said adjusting point and values of at least first order derivatives thereof also match each other at said adjusting point.

17. A convergence correction data preparation system according to claim 16, wherein each of said interpolating functions is a second order function.

18. A convergence correction data preparation system according to claim 16, wherein each of the interpolating functions is a third order function and values of second order derivatives of the interpolating functions for two adjacent sub-sections sandwiching an adjusting point match each other at said adjusting point.

19. A convergence correction data preparation system according to claim 16, wherein the interpolating operation means includes means for determining, for each section subjected to interpolation, a constant matrix specific to each of a plurality of coordinate positions of a plurality of correction points including a plurality of adjusting points in said section and calculating the interpolating function matrix with each element thereof providing an interpolating function for a sub-section by multiplying the constant matrix by an adjustment data matrix given from an adjustment operator for a plurality of said adjusting points.

20. A convergence correction data preparation system according to claim 16, wherein an interpolation variable used for the interpolating operation is an arbitrary one of time related to the scanning of the scanning line, a memory address generated in synchronism with the scanning of the scanning line and scanning line number.

21. A convergence correction data preparation system according to claim 16, wherein the interpolation variable used for the interpolating operation is a detected value of a deflection current of the cathode ray tube.

22. A convergence correction data preparation system according to claim 16, wherein the interpolating operation by the interpolating operation means includes one of interpolation and extrapolation.

23. A convergence correction data preparation system according to claim 17, wherein the interpolating functions for a predetermined set of adjacent two sub-sections in a section subjected to interpolation are expressed by a same interpolation function.

24. A convergence correction data preparation system according to claim 23, wherein said predetermined set of said adjacent two sub-sections are centrally positioned in a range of the section subjected to interpolation.

25. A convergence correction data preparation system according to claim 18, wherein the values of the second order derivatives of the interpolating functions for sub-sections at ends of the section subjected to interpolation are set to zero at the adjusting points at said ends.

26. A convergence correction data preparation system according to claim 18, wherein a hypothetical adjusting point is provided outward of each end of the section subjected to interpolation, and correction data for the hypothetical adjusting point is set in accordance with the interpolating function for a sub-section at said end.

27. A convergence correction data preparation system according to claim 26, wherein the correction data for the hypothetical adjusting point is given as the sum of the products of the correction data for each adjusting point and a predetermined constant.

28. A convergence correction data preparation system according to claim 18, wherein the interpolating functions for at least two sets of adjacent two sub-sections in the section subjected to interpolation are the same function.

29. A method of convergence correction on a screen of a display unit using at least one cathode ray tube, comprising the steps of:
determining in advance and storing in a memory correction data for convergence adjusting points selected at predetermined intervals on the screen;
reading the correction data from the memory;
determining correction data by an interpolating operation at a predetermined correction point between adjacent adjusting points by use of the correction data read out of the memory; and
correcting the convergence of the display unit on the basis of the correction data determined,
wherein said interpolating operation is a combination of one-dimensional interpolating operations associated with horizontal and vertical directions respectively of the screen, each of a plurality of sets of adjacent adjusting points on a section subjected to the interpolating operation defines a sub-section, and wherein each of the one-dimensional interpolation operations sets an interpolating function for determining correction data at correction points in said sub-section in such a manner that the values of interpolating functions for two adjacent sub-sections sandwiching an adjusting point are continuous at said adjusting point and the values of at least the first order derivatives thereof are also continuous at said adjusting point.

30. A method according to claim 29, wherein each of said interpolating functions is a second order function.

31. A method according to claim 29, wherein each of the interpolating functions is a third order function, and the interpolating functions for two adjacent sub-sections sandwiching an adjusting point have the second order derivatives thereof which are continuous across said adjusting point.

32. A method according to claim 29, wherein said interpolating operation is performed such that a constant matrix specific to each coordinate position of a correction point including an adjusting point in each section subjected to interpolation is determined, and an interpolating function matrix with each element thereof constituting an interpolating function for a sub-section is calculated by multiplying said constant matrix by adjustment data matrix given by an adjustment operator for said adjusting point.

33. A method according to claim 29, wherein an interpolation variable used for the interpolating operation is an arbitrary one of time related to the scanning of the scanning line, memory address generated in synchronism with the scanning of the scanning line and scanning line number.

34. A method according to claim 29, wherein an interpolation variable used for said interpolating operation is a detected value of a deflection current of said cathode ray tube.

35. A method according to claim 29, wherein said interpolating operation includes one of interpolation and extrapolation.

36. A method according to claim 30, wherein the interpolating functions for a predetermined set of adjacent two sub-section in a section subjected to interpolation are expressed in a same interpolation function.

37. A method according to claim 36, wherein said predetermined set of said adjacent two sub-sections are positioned at the center of a range of a section subjected to interpolation.

38. A method according to claim 31, wherein the values of the second order derivatives of the interpolating functions for the sub-sections at ends of the linear section subjected to interpolation are set to zero at the adjusting points at said ends.

39. A method according to claim 31, wherein a hypothetical adjusting point is provided outward of each end of the section subjected to interpolation, and correction data for the hypothetical adjusting point is set in accordance with the interpolating function for a sub-section at said end.

40. A method according to claim 39, wherein the correction data for the hypothetical adjusting point is given as the sum of the products of the correction data for each adjusting point and a predetermined constant.

41. A method according to claim 31, wherein the interpolating functions for two sets of adjacent two sub-sections in a section subjected to interpolation are the same function.

42. An image display apparatus comprising:
at least a cathode ray tube including a convergence yoke;
a deflection circuit connected to said cathode ray tube;
a video circuit having an output connected to said cathode ray tube;
a video signal input terminal;
a pattern generator for generating a pattern signal for convergence adjustment;

switching means for selectively applying one of the input of said video signal and the output of said pattern generator to said video circuit; and a convergence correction device having an output connected to said convergence yoke for correcting the convergence of the screen when the convergence adjustment pattern is projected on the screen of the cathode ray tube, said convergence correction device including convergence correction data preparation means which includes:

memory means for storing correction data for each convergence adjusting point selected at predetermined intervals on the screen; and interpolating operation means for preparing correction data by interpolation at predetermined correction points between adjusting points by use of the correction data for the adjusting point read from said memory means, wherein said interpolating operation means performs an interpolating operation which is a combination of one-dimensional interpolating operations corresponding respectively to the horizontal and vertical directions of the screen, each set of adjacent adjusting points in a section subjected to interpolation defines a sub-section in horizontal and vertical directions on the screen, and wherein said one-dimensional interpolating operation sets correction data for correction points in said sub-section in such a manner that values of interpolating functions for two adjacent sub-sections sandwiching an adjusting point match each other at said adjusting point, and values of at least the first order derivatives also match each other at said adjusting point.

43. An apparatus according to claim 42, further comprising a screen for projecting an image from said cathode ray tube.

* * * * *